(12) United States Patent
Salgarelli et al.

(10) Patent No.: US 10,699,542 B2
(45) Date of Patent: Jun. 30, 2020

(54) ELECTRONIC MOVEMENT DETECTION DEVICES

(71) Applicant: Inxpect S.p.A., Brescia (BS) (IT)

(72) Inventors: Luca Salgarelli, Brescia (IT); Giuseppe Bellandi, Brescia (IT)

(73) Assignee: INXPECT S.P.A., Brescia (BS) (IT)

( * ) Notice: Subject to any disclaimer, the term of this patent is extended or adjusted under 35 U.S.C. 154(b) by 96 days.

(21) Appl. No.: 16/137,836

(22) Filed: Sep. 21, 2018

(65) Prior Publication Data

US 2019/0096207 A1 Mar. 28, 2019

(30) Foreign Application Priority Data

Sep. 25, 2017 (IT) .................. 102017000107036

(51) Int. Cl.
*G01P 1/02* (2006.01)
*G08B 13/196* (2006.01)
*G01S 13/88* (2006.01)
*G08B 25/10* (2006.01)
*G03B 17/02* (2006.01)
*G03B 17/56* (2006.01)
(Continued)

(52) U.S. Cl.
CPC ...... *G08B 13/19632* (2013.01); *G01S 13/886* (2013.01); *G03B 17/02* (2013.01); *G03B 17/561* (2013.01); *G08B 13/19619* (2013.01); *G08B 25/10* (2013.01); *H04N 5/2252* (2013.01); *H04N 5/2254* (2013.01); *G01S 2007/027* (2013.01)

(58) Field of Classification Search
CPC combination set(s) only.
See application file for complete search history.

(56) References Cited

U.S. PATENT DOCUMENTS

2014/0083188 A1 * 3/2014 Helenelund ............. G01P 1/023
73/493

FOREIGN PATENT DOCUMENTS

EP 2397898 A1 12/2011
EP 3041214 A1 7/2016

OTHER PUBLICATIONS

Italian Search Report and Written Opinion dated Jun. 7, 2018, in IT Application No. 102017000107036, 7 pages.

* cited by examiner

*Primary Examiner* — Howard D Brown, Jr.
(74) *Attorney, Agent, or Firm* — MH2 Technology Law Group, LLP (57) ABSTRACT

An electronic motion detection device (1) comprises a support structure (2) adapted to be fixed to a wall and a spherical body (3), which is rotatably supported by the support structure (2) and adapted to be locked in a plurality of spatial orientations. A detection member (4) comprises a sensitive element such as a radar antenna and an interface (44) configured to exchange configuration data. Such member is adapted to be inserted into a seat (31) of the spherical body (3) in a direction of insertion (X-X), and may be locked to the seat (31) of the spherical body (3) in an operating position ad in a configuration position. In the operating position, the spherical body (3) and the detection device (4) are arranged in such a manner as to prevent a user to access the interface (44) whereas, in the configuration position, the detection member (4) is translationally shifted in the direction of insertion (X-X) with respect to the operating position to be operated, for the user to be able to access the interface (44).

13 Claims, 7 Drawing Sheets

(51) Int. Cl.
*H04N 5/225* (2006.01)
*G01S 7/02* (2006.01)

ELECTRONIC MOVEMENT DETECTION DEVICES

CROSS-REFERENCE TO RELATED APPLICATION(S)

This application claims priority under 35 U.S.C. § 119 from Italian Patent Application No. 102017000107036, filed on Sep. 25, 2017, in the Italian Patent and Trademark Office ("IPTO"), the entire contents of which are incorporated herein by reference.

FIELD OF THE INVENTION

The invention finds application in the field of electronic motion detection devices, such as radars and cameras. Particularly, the invention relates to a radar-based motion detection device that affords easy installation and configuration.

DESCRIPTION OF THE PRIOR ART

Electronic motion detection devices for residential or industrial environments, such as those having intrusion prevention purposes, are usually installed in fixed positions, to monitor the same environment for long periods of time. Depending on the structure of the environment and the presence of any objects therein, the device may be conveniently fixed, for example, to a wall or to the ceiling.

Once the device has been so fixed, the sensitive element of the device (an antenna or a lens) must be facing the space to be monitored. It is therefore desirable the possibility to provide various orientations of the sensitive element relative to a support structure of the device, which is directly fixed to the relevant wall.

It shall be noted that the sensitive element in a device is sometimes adapted to monitor a region of an environment that is wide in a predetermined direction and narrow in a different direction. For example, an antenna of a micro-wave sensor may monitor a space with an aperture angle of 90° in a maximum aperture direction, and at the same time with an aperture angle of 30° in a minimum aperture direction, perpendicular to the maximum aperture direction.

Therefore, the sensitive element may have such an orientation that the maximum aperture direction will be, for instance, a vertical direction, to detect the passage of objects through a virtual barrier, or a horizontal direction, to follow the movements of foreign bodies in a wide area.

Security cameras may use a hemispherical body to obtain the desired orientations. These are called "dome cameras". In fact, an appropriate design of the support structure may allow the spherical body to rotate relative to the support structure.

Once the desired orientation has been obtained, the spherical body and the support structure are fixed together to prevent further rotation, thereby maintaining the selected orientation during operation of the camera. The sensitive element proper (here the lens) is embedded or inserted in the spherical body, and also maintains the same orientation.

It shall be noted that, for outdoor applications, the installation of the device must ensure perfect tightness against moisture or other potentially hazardous weather agents throughout its lifecycle.

The installation of an anti-intrusion device usually requires configuration and setting of its operating parameters. This is useful, for example, for the device to perform a first detection in which it defines the boundaries of the environment to be monitored or the positions of the objects that are stably present therein, or to calibrate detection thresholds with respect to external agents (sun, plants, etc.). Then the device will be able to distinguish a foreign body in the environment. For this reason, when the device is configured, it is already in the position in which it will remain during operation to monitor the environment.

Problem of the Prior Art

A Wi-Fi interface may be used to provide the device with the information required to start its configuration. Nevertheless, particularly to ensure protection of the device from weather agents, typically such interface must be permanently incorporated therein, which will increase dimensions and costs.

Alternatively, a wired connection to a computer may be provided for configuration of the device. This will also increase the costs of the system and of its installation, which requires a considerable time and the presence of specialist staff.

SUMMARY OF THE INVENTION

The object of the present invention is to provide an electronic motion detection device that can be easily positioned and configured for operation. Particularly, reference will be made to a radar detection technology.

A further object of the invention is to reduce the fabrication, installation and configuration costs of an electronic motion detection device that is used for intrusion prevention purposes.

Another object of the invention is to provide a small-size electronic motion detection device, without any equipment that is not strictly required during the monitoring operation of the electronic device.

These and other objects are fulfilled by a radar detection device as defined in any of the accompanying claims. The device of the invention comprises a support structure that is adapted to be fixed to a wall and a spherical body that is rotatably supported by the support structure in such an arrangement as to be able to be fixed to the support structure in the desired spatial orientation.

A detection member is adapted to be inserted into a seat of the spherical body in a direction of insertion, and is equipped with a sensitive element, that is configured to sense the movement of a body in an environment, and with an interface that is configured to receive configuration data for the sensitive element.

The detection device is adapted to be locked to the seat of the spherical body in an operating position, in which the detection member and the spherical body are in such an arrangement as to prevent a user from accessing the interface, and in a configuration position, in which the interface is accessible. The detection device in the configuration position is translationally shifted in the direction of insertion relative to the operating position.

Advantageously the electronic device needs to be sealed when the detection member is in the operating position, but not when it is in the configuration position. Therefore, the interface requires no special weather protection, as it is protected by the spherical body during operation. Then, the interface may also include exposed electronic components, such as a common USB port or another serial interface.

A removable device (hereinafter referred to as dongle) having a Wi-Fi interface may be applied to such port, and can temporarily allow the electronic device, during configuration, to wirelessly communicate with a computer for setting its parameters. This will allow simple and quick configuration of the electronic device, whereupon the dongle may be removed once configuration has been completed. It shall be noted that no permanent bulky and expensive wireless communication equipment is provided in the electronic device.

Advantageously, the possibility of locking the detection member in two distinct positions, one being obtained from the other by translation, with no permanent rotation, allows the electronic device to avoid detection of significant differences in the positions of the walls and objects in the environment between the configuration step and later operation. Therefore, the possibility of distinguishing stationary objects from intruding objects is preserved. It should be particularly appreciated that the resolution of a microwave radar may be, for example, 30 cm, whereas the displacement of the detection device between the operating position and the configuration position in the direction of insertion may be, for example, 1 cm.

BRIEF DESCRIPTION OF THE DRAWINGS

The characteristics and advantages of the present invention will result from the following detailed description of a possible practical embodiment, illustrated as a non-limiting example in the set of drawings, in which.

DETAILED DESCRIPTION

The accompanying figures show an electronic motion detection device of the invention, generally designated by numeral 1. The device 1 is preferably designed for use in radar detection for intrusion prevention monitoring.

The device 1 comprises a support structure 2 that is adapted to be fixed to a wall, which may be a vertical wall, a horizontal wall such as a ceiling, or an oblique wall inclined to a desired angle depending on installation and monitoring requirements.

The device 1 also comprises a spherical body 3 associated with the support structure 2 and rotatably supported by the support structure 2. In the embodiment of the annexed figures, the spherical body 3 comprises two hemispherical bodies 3a, 3b that are sealingly coupled together. Such seal can preferably prevent the infiltration of dust, moisture, and/or water, even upon immersion to a given depth, e.g. ranging from 15 cm to 1 m, and for a predetermined time, for example a minimum time of 30 minutes, in accordance with standards such as IP67 (standard ANSI IEC/60529-2004). An IP67 cable gland (not shown) is provided on the back of the part 3b, to provide the seal in the cable passage area, e.g. for the passage of power cords (not shown).

In order to support the spherical body 3, the support structure 2 comprises a bearing element 21 that can be directly fixed to a wall, and a locking element 22 associated with the bearing element 21. The bearing element 21 and the locking element 22 define a support seat adapted to receive the spherical body 3. The locking element 22 is adapted to retain the spherical body 3 against the bearing element 21 in a plurality of spatial orientations, given by the possible positions that can be assumed by the spherical body 3 rotating in the support seat.

The bearing element 21 has a first support rib 23, and the locking element 22 has a second support rib 24, formed to adhere to the spherical body 3. The two support ribs 23, 24 may have a curvilinear, for example circular profile, such that they may adhere to the spherical body 3 substantially regardless of its orientation, selected from the plurality of admitted spatial orientations.

In the embodiment of the annexed figures, the bearing element 21 comprises a mounting plate 21, which is adapted to be fixed to a wall by any fixation means known to those skilled in the art, such as screws, and a positioning body 21b in which the first support rib 23 is formed.

The positioning body 21b is adapted to be fixed to the mounting plate, for example by means of screws and/or snap-fit engagement, and similarly the locking element 22, is adapted to be fixed to the bearing element 21, for example by means of screws and/or snap-fit engagement.

The first support rib 23 delimits a first opening for the passage of cables. The second support rib 24 delimits a second opening through which the spherical body 3 at least partially emerges from the support structure 2. The mounting plate 21a has a third opening 25, facing the first opening for cable passage.

Therefore, the device 1 is assembled by the steps of positioning the spherical body 3 against the first support rib 23 in a desired spatial orientation, and associating the locking element 22 with the bearing element 21, with the second support rib 24 abutting against the spherical body 3. Thus, the spherical body 3 is clamped between the first and the second support ribs 23, 24. Therefore, the spherical body 3 can be locked to the support structure 2 in any spatial orientation from the plurality of admitted spatial orientations.

When the locking element 22 is fixed to the bearing element 21, the spherical body 3 is locked in the selected spatial orientation by mechanical interference with the first and second support ribs 23, 24.

The device 1 comprises a detection member 4 comprising a sensitive element, which is configured to sense the movement of a body in an environment, such as a lens of a camera or a radar antenna (not shown). The spherical body 3 has a seat 31, and the detection member 4 is designed to be inserted into the seat 31 of the spherical body 3 in a direction of insertion X-X. The spherical body 3 also has an access opening 32 for access to the seat 31. The access opening 32 is delimited by an edge 32a of the spherical body 3.

The sensitive element is configured to receive signals through the second opening of the support structure 2 and the access opening 32 for access to the seat 31 of the spherical body 3. For example, in the case of a radar antenna, the sensitive element is configured to transmit a first radio signal and to receive a second radio signal reflected by at least one object in the environment being monitored. It shall be noted that in the admitted spatial orientations of the spherical body 3, the seat 31 is always accessible through the first opening 23 of the support structure 2, for proper operation of the sensitive element.

The detection member 4 and the seat 31 of the spherical body 3 preferably have a cylindrical shape, and in the illustrated embodiment the seat 31 of the spherical body 3 defines a through channel, which extends through the spherical body 3 between the access opening 32 and a rear opening 33. Namely, the through channel passes through the two hemispherical bodies 3a, 3b. In addition, the seat 31 is accessible from both the first opening and the second opening of the support structure 2.

Therefore, the cables for powering the sensitive element and any other electronic parts can reach the detection member 4 through the first opening of the support structure 2 and the rear opening 33 of the spherical body 3 as well as the third opening 25 of the mounting plate 21a. It shall be noted that these cables extend through the cable gland for accessing the detection member 4.

The device 1 comprises guide means 5, which are configured to guide the insertion of the detection device 4 into the seat 31 of the spherical body 3. The guide means 5 are associated with the detection member 4 and to the seat 31 of the spherical body 3. The guide means 5 preferably comprise a slider 51 and at least one guide, for example in the form of a groove along which the slider 51 is able to slide.

In the preferred embodiment, the slider 51 is associated with the detection member 4 and at least one guide is associated with the seat 31 of the spherical body 3, but a skilled person will obviously recognize that the position of the slider 51 and the at least one guide can be reversed to obtain the same effect in an equivalent manner.

As described below in further detail, the guide means 5 may comprise a plurality of guides, that are preferably connected to one another, thereby forming a single guide, which may also be branched.

In the preferred embodiment, in view of symmetry requirements and optimized distribution of mechanical stresses, a plurality of sliders 51 are provided, namely three sliders 51, which are equally angularly spaced on the detection member 4 or in the seat 31 of the spherical body 3 about an axis of rotation A-A, which extends in the direction of insertion X-X. Likewise, at least one guide may be provided for each slider 51. The guides designed for distinct sliders must obviously have corresponding shapes. Nevertheless, one slider 51 and the at least one associated guide will be described below, referring to all the sliders 51 and all the guides.

The guide means 5 comprise an insertion guide 52, and the slider 51 is able to slide along the insertion guide 52 during insertion and removal of the detection member 4 relative to the seat 31 of the spherical body 3. The insertion guide 52 extends in the direction of insertion X-X. It shall be noted that the detection member 4 can be entirely pulled out of the seat 31 of the spherical body 3, with a movement guided by the sliding motion of the slider 51 in the insertion guide 52.

Figure 1:
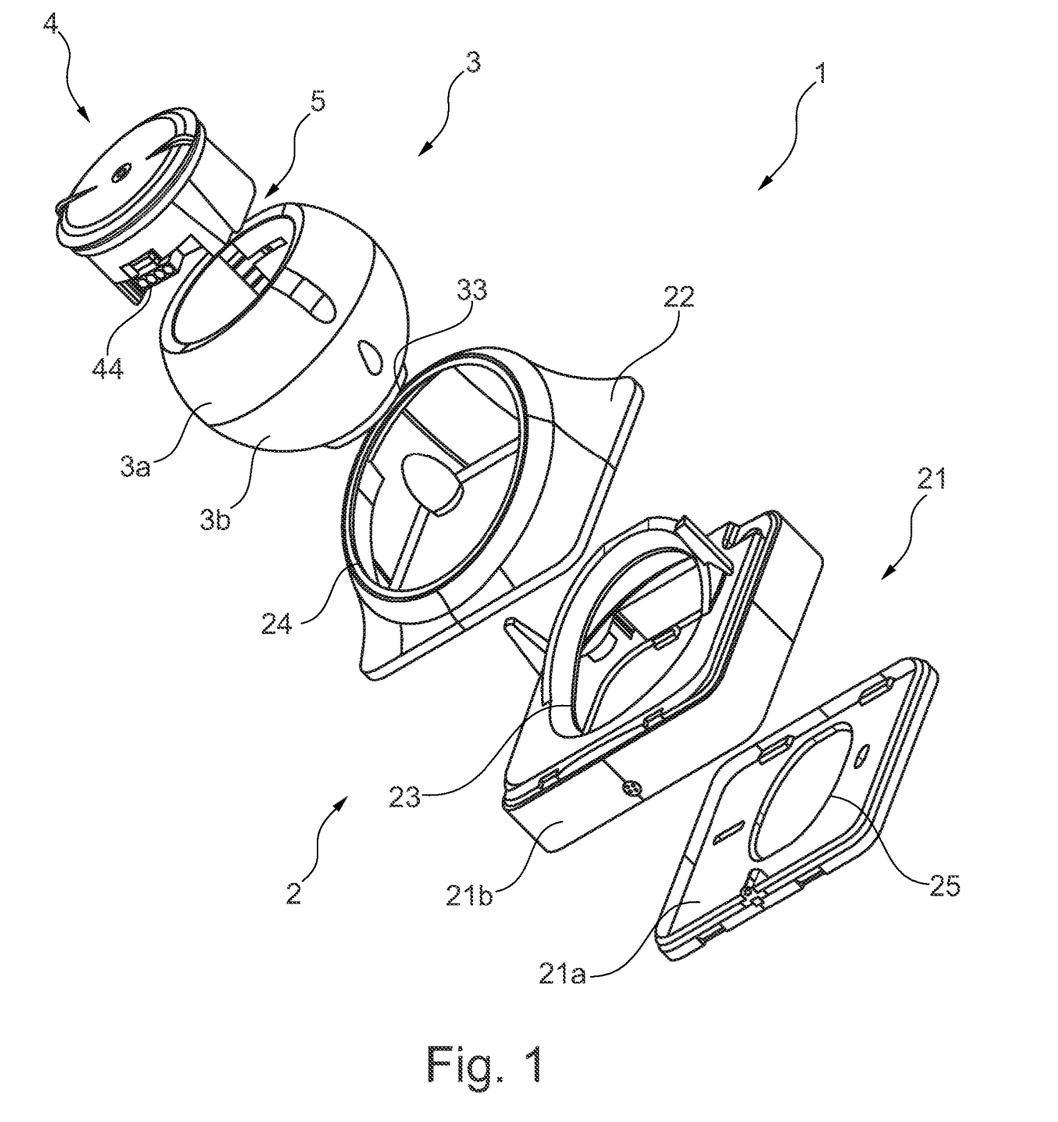
FIG. 1 is an exploded view of an electronic motion detection device of the invention.
Figure 2:
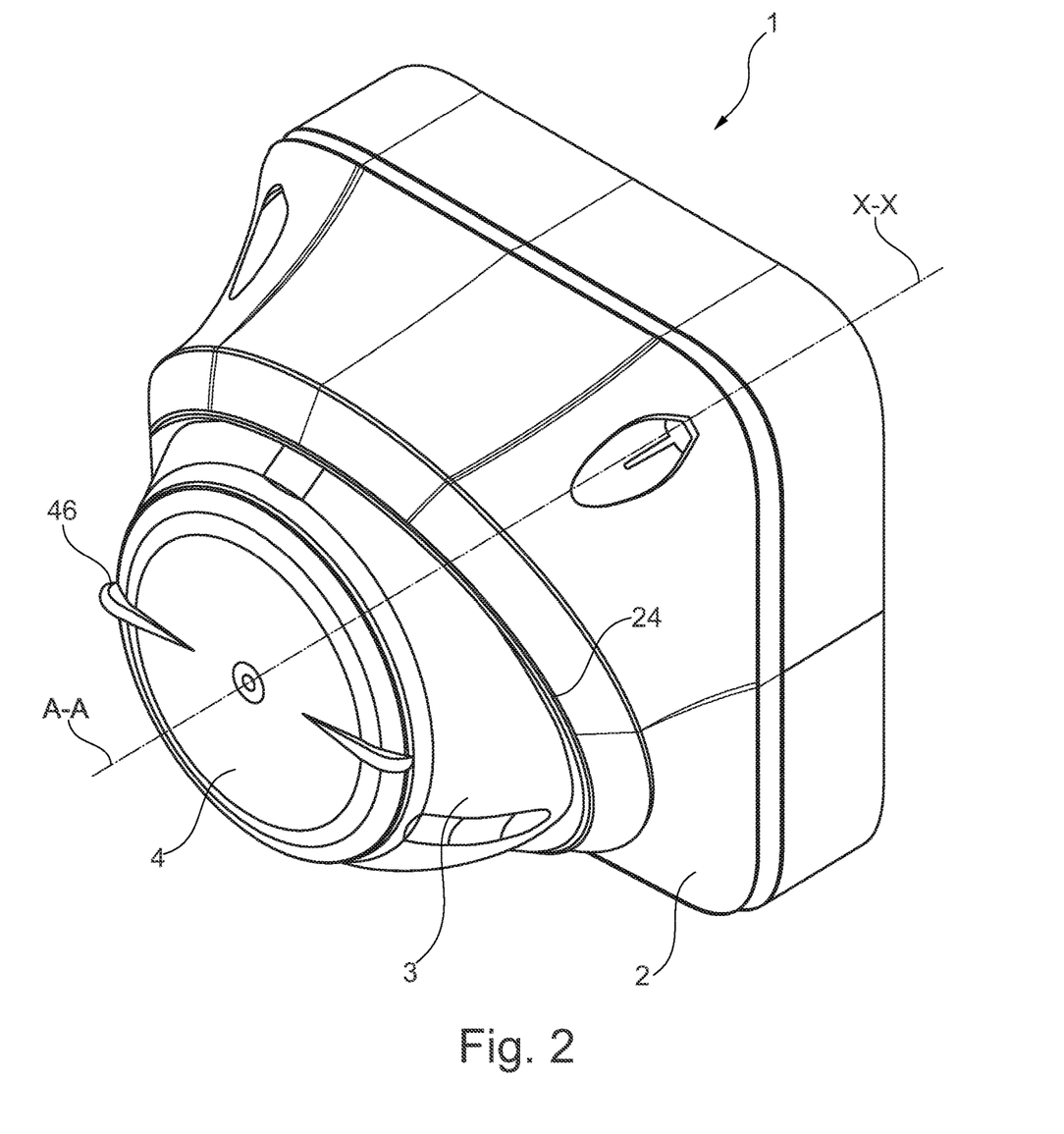
FIGS. 2 and 3 show the device of FIG. 1 in an assembled state, with a detection member arranged in two different orientations.
Figure 3:
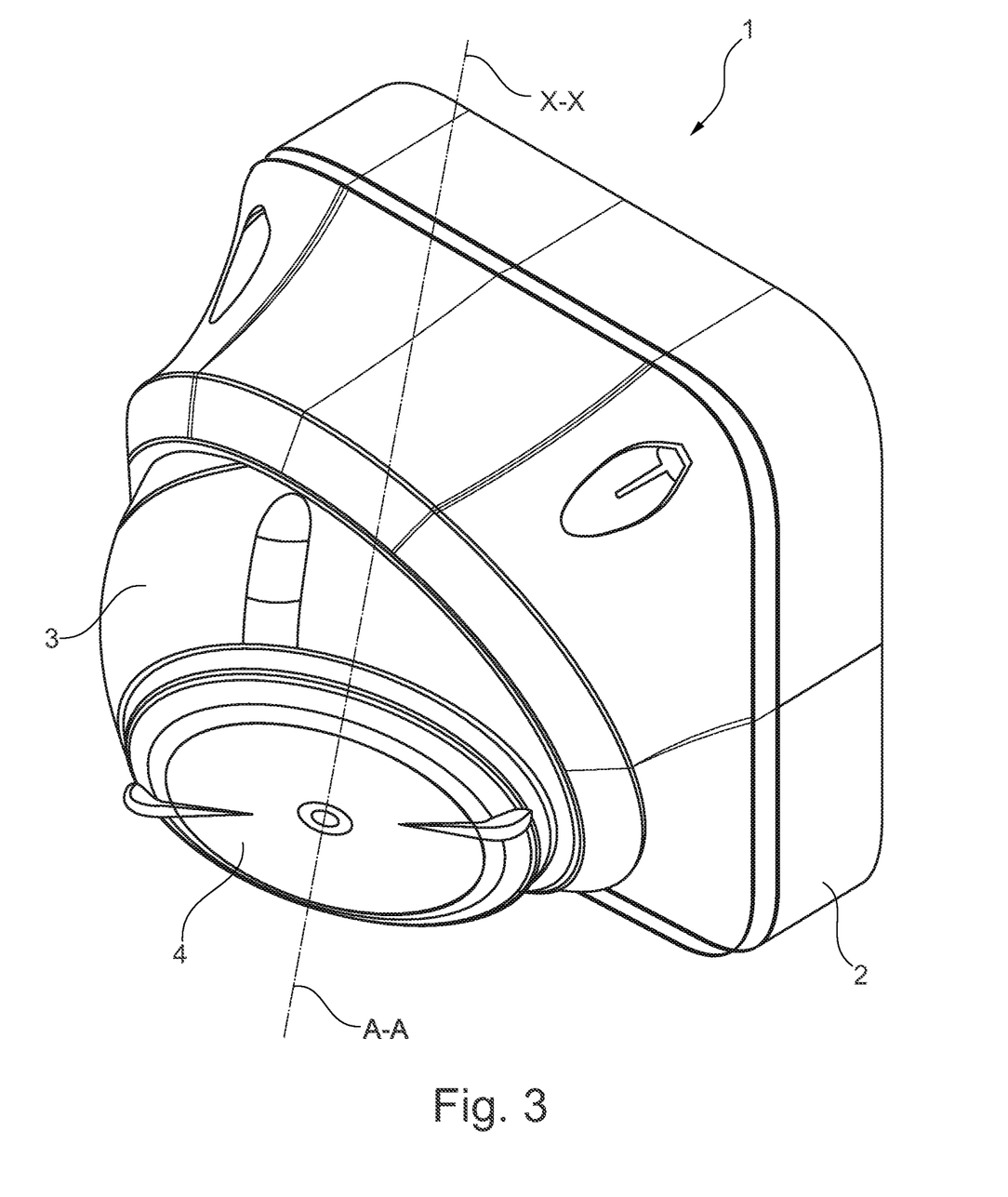
Figure 4:
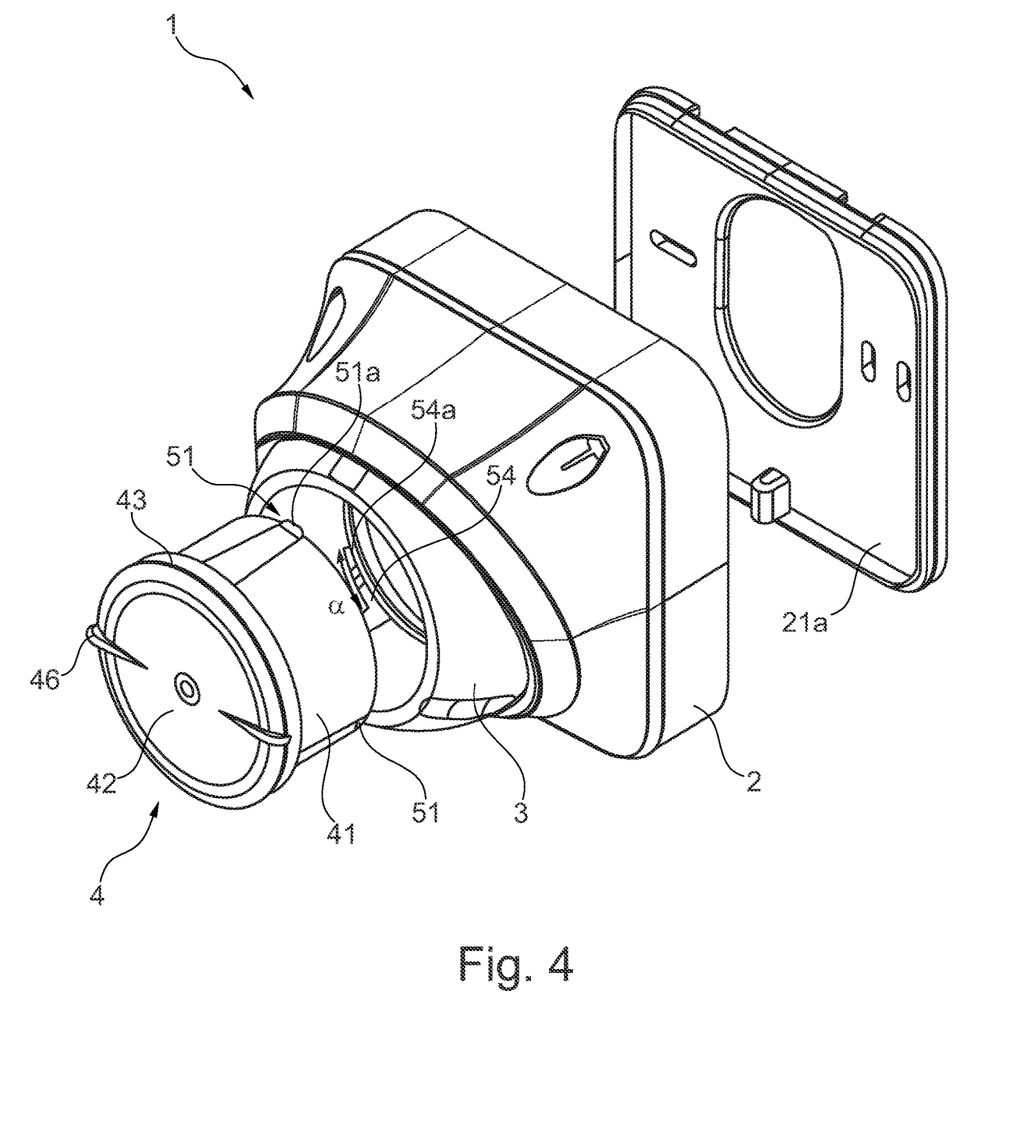
FIG. 4 shows a different exploded view of the device of FIG. 1, depicting the parts of the device that the installer shall install and configure.
Figure 5:
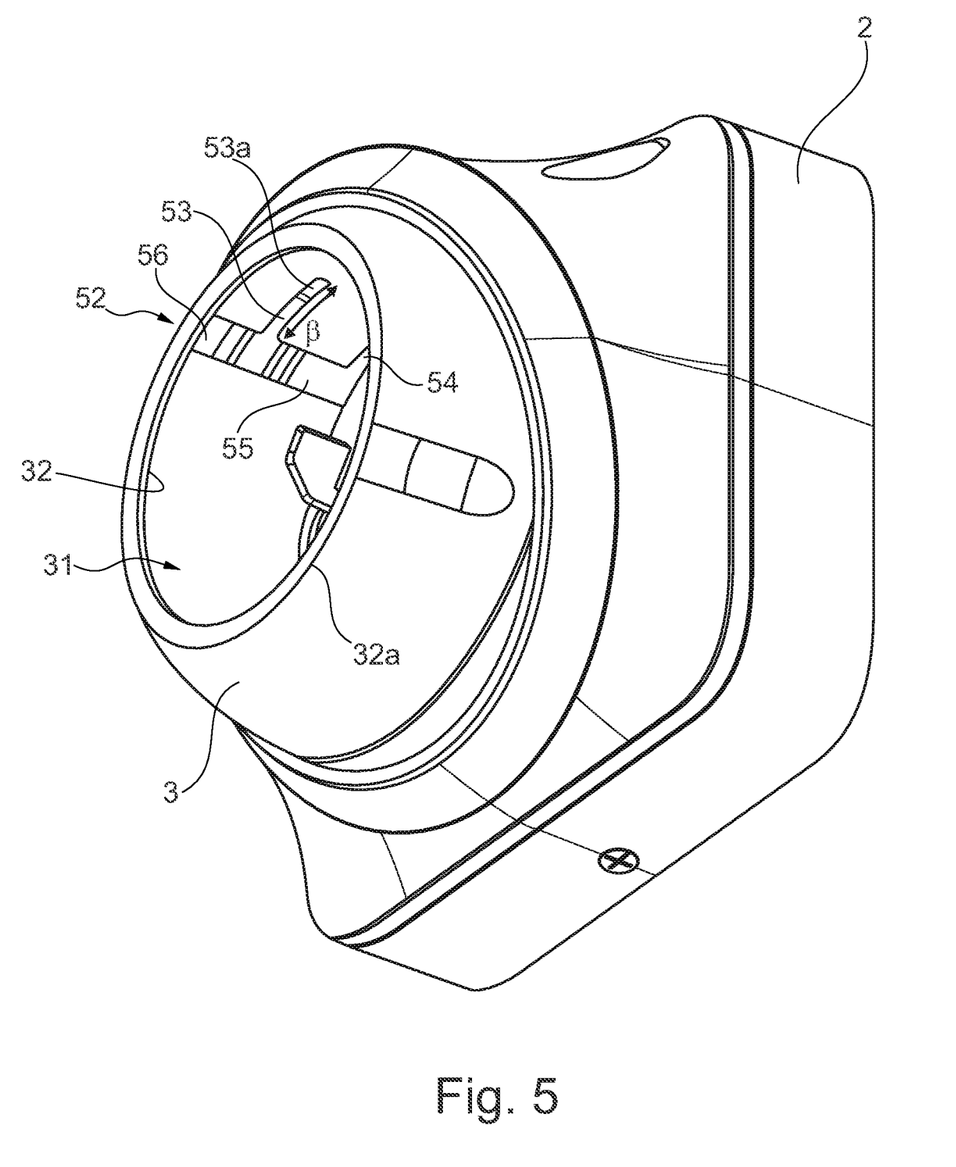
FIG. 5 shows a partial view of the device of FIG. 1, once the installer has mounted the frame to the wall.

The detection member 4 is lockable to the seat 31 of the spherical body 3 in an operating position, as shown, for example, in FIG. 2. In the operating position, the access opening 32 for access to the seat 31 is sealingly closed by the detection member 4, with the above-discussed sealing properties. Namely, the detection member 4 comprises a support body 41 for the sensitive element and a closure member 42. The closure member 42 has an edge 43 that, in the operating position, abuts the edge 32a of the spherical body 3 which delimits the access opening 32 for access to the seat 31.

In particular, an O-ring is placed between the seat 31 and the detection member 4, and is preferably associated with the edge 43 of the closure element 42 or with the edge 32a of the spherical body 3 which delimits the access opening 32 for access to the seat 31. The O-ring is adapted to be compressed between the spherical body 3 and the detection member 4 for sealing the seat 31 in the operating position.

In the operating position the support body 41 for the sensitive element is arranged in the seat 31.

Further details about how the detection member is inserted into the seat 31 and is locked in the operating position are given hereinbelow.

In one aspect of the invention the detection member 4 comprises an interface 44 which is configured to exchange configuration data for the sensitive element. The configuration data may comprise, for instance, the command to carry out a reference radar detection.

The interface 44 is namely placed at the support body 41 for the sensitive element. The interface 44 comprises a connection port 45, which is a USB port in the preferred embodiment.

Thus, the device 1 may be advantageously used in combination with a transmission device (not shown), which is adapted to be plugged into the connection port 45. The transmission device is configured to establish a wireless connection to exchange the configuration data via the interface 44 between the sensitive element and a remote computing device, such as a computer or a smartphone. The transmission device is preferably a Wi-Fi dongle.

It shall be noted that the use of a Wi-Fi dongle is very simple and inexpensive, as it requires no wiring, has a very small size, is available on the market at a low cost, and must not be permanently integrated in the electronic device 1. In addition, a single transmission device may be reused for configuration of a number of electronic devices 1.

In one aspect of the invention, in the operating position, the spherical body 3 and the detection member 4 are in such an arrangement as to prevent a user from accessing the interface 44. In other words, in the operating position the edge 32a of the spherical body 3 which defines the access opening 32 for access to the seat 31 covers the interface 44, i.e., the interface 44 is arranged in the seat 31.

It shall be noted that, in the operating position, the seat 31 is closed by the detection member 4, and particularly by the closure member 42, and therefore the interface 44 is protected from external agents. Therefore, advantageously, in the operating position, the presence of the interface 44 and particularly the communication port 45 inside the seat 31 does not affect the overall tightness of the entire device 1 against infiltration of dust, moisture and/or liquids.

Figure 7:
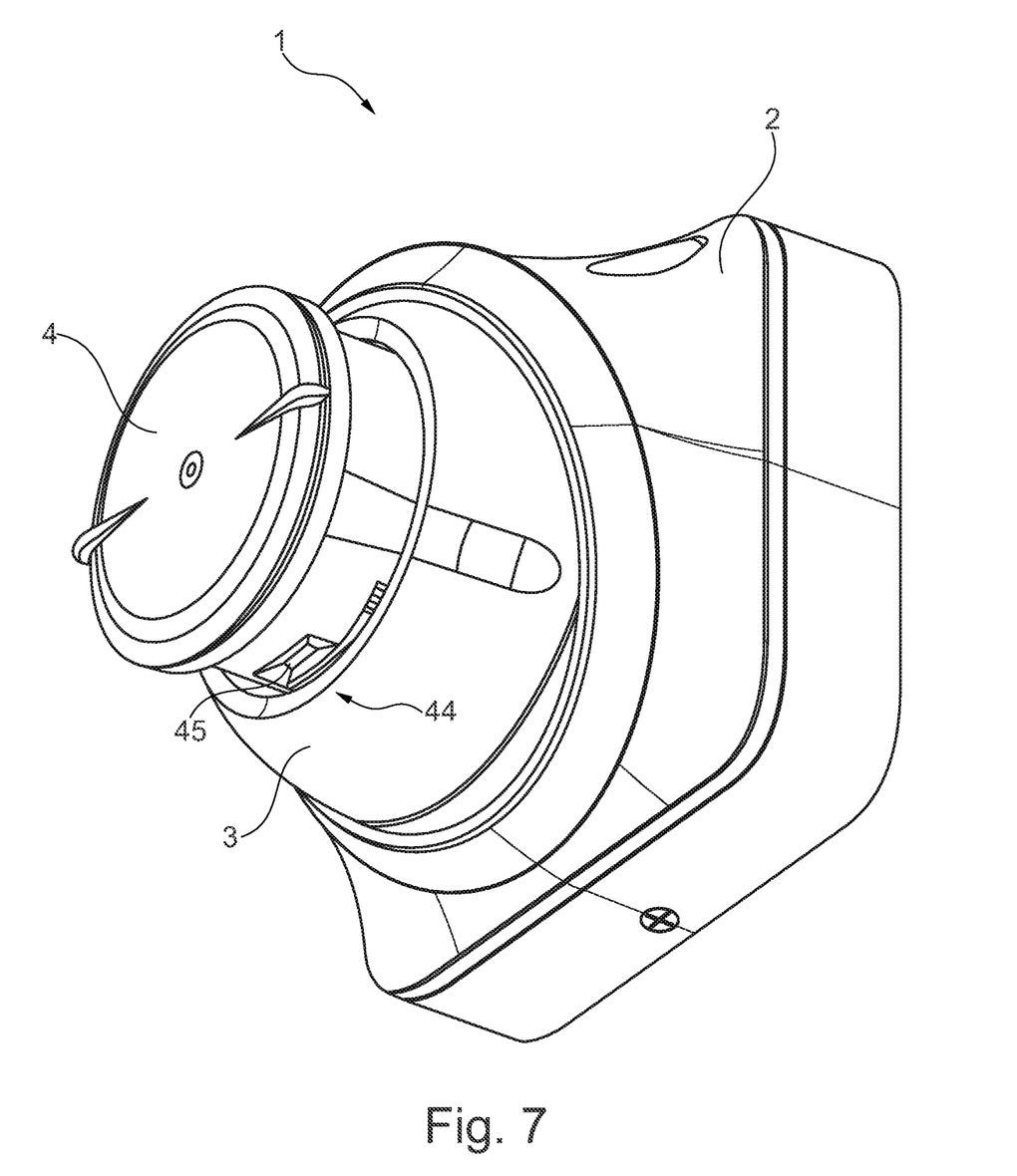

In one aspect of the invention, the detection member 4 is adapted to be locked to the seat 31 of the spherical body 3 also in a configuration position, which is distinct from the operating position, as shown, for example, in FIG. 7. In the configuration position the detection member 4 is at least partially pulled out of the seat 31. Namely, in the configuration position, the detection member 4 is translationally shifted in the insertion direction X-X with respect to the operating position, such that the interface 44 can be accessed by a user. In other words, in the configuration position the interface 44 emerges from the seat 31, and particularly from the edge 32a of the spherical body 3 that defines the access opening 32 for access to the seat 31.

It will be thus appreciated that the transmission device can be plugged into the connection port 54 when the detection member 4 is in the configuration position and not in the operating position. It should be further noted that in the configuration position the device 1 is not necessarily sealed against ingress of external agents. Nevertheless, this is acceptable due to the short time required to configure the sensitive element.

It should be emphasized that this disclosure sometimes states that the detection member 4 in a given position is shifted and/or rotated relative to a different position that can be assumed by the detection member 4 itself at a different time. Such statements are not intended to limit the path that the detection member follows as it moves between one position and the other, but only to express a relationship between the two positions. Therefore, if there is a translational relationship between two positions, this does not necessarily mean that the detection member 4 performs a translational motion as it moves from one position to the other along the shortest path. Likewise, the statement that there is a rotational relationship between two positions with a given angle is not intended to exclude the possibility that the motion from one position to the other involves a rotation given not only by the angle in question, but by the addition or subtraction of this angle relative to one or more full revolutions.

As explained above, the position of the sensitive element is desired to remain unchanged relative to the position of the various objects that are placed in the environment to be monitored from the sensitive element configuration time to the later operation of the device 1. It should be particularly noted that the support structure 2 constitutes one of the objects that can have a permanent influence on the radio signals transmitted and received by the sensitive element.

Therefore, in the configuration position the detection member 4 is translationally shifted in the direction of insertion X-X with respect to the operating position at as short a distance as possible, e.g. shorter than 5 cm, preferably shorter than 3 cm, and in the preferred embodiment 1 cm. A similar distance is admitted as it is significantly smaller than the resolution of the device 1, that can be for example greater than 10 cm, preferably greater than 20 cm.

It shall be noted that, for the purposes of object position detection, especially in radar detection, an angle of the object relative to a reference direction may be significant, in addition to its distance from the sensitive element. Therefore, preferably the detection member 4 in the configuration position is substantially unrotated relative to the operating position, especially about the axis of rotation A-A.

Since the support structure 2 may be applied to walls with various orientations and the spherical body 3 may have different orientations relative to the support structure 2, the detection member 4 may be at least partially directed downwards, whereby gravity will at least partially act in the direction of insertion X-X with a pull-out orientation that will tend to pull the detection member 4 out of the seat 31.

Therefore, in the operating position and/or in the configuration position, the detection member 4 is coupled to the seat 31 of the spherical body 3 such that it cannot be released in the direction of the insertion X-X. Particularly, as more clearly explained below, the detection member 4 can be inserted into the seat up to the operating position and/or the configuration position by means of a bayonet sliding system. Preferably the guide means 5 provide such bayonet sliding system, i.e. are configured to guide the insertion of the detection device 4 into the seat 31 up to the operating position and/or the configuration position.

Namely, the detection member 4 can move with respect to the seat 31 of the spherical body 3 between the operating position and at least one intermediate position, and between the at least one intermediate position and the configuration position. In the at least one intermediate position the detection member 4 can be at least partially pulled out of the seat 31, and can particularly move relative to the seat 31 in the direction of the insertion X-X. For example, in the at least one intermediate position the slider 51 can slide along the insertion guide 52. The detection member 4 is configured to seal the seat 31 as it moves from the at least one intermediate position to the operating position.

The detection member 4 in the at least one intermediate position is rotated about the axis of rotation A-A relative to the operating position by a first angle α, preferably ranging from 15° to 120°, for example 30°. Furthermore, in the configuration position, the detection member 4 is rotated relative to the at least one intermediate position about the rotation axis A-A by a second angle β, which is equal and opposite to the first angle α.

By this arrangement, as mentioned above, the detection member 4 in the configuration position is substantially unrotated relative to the operating position, especially about the axis of rotation A-A. It shall be noted that this is true irrespective of the path followed by the detection member 4 as it moves between the various positions. It should be also noted that the provision of a second angle β equal and opposite to the first angle α is perfectly equivalent to the provision of a second angle β explementary to the first angle α.

Also, it should be noted that, in addition to the described rotation, in the at least one intermediate position, the detection member 4 may be also translationally shifted in the direction of insertion X-X relative to the operating position and/or the configuration position.

In the preferred embodiment, the at least one intermediate position comprising a first intermediate position and a second intermediate position. The detection member 4 can particularly move from the operating position to the first intermediate position, from the first intermediate position to the second intermediate position, and from the second intermediate position to the configuration position. More in detail the detection member 4 can move from the operating position to the first intermediate position by rotating about the axis of rotation A-A, from the first intermediate position to the second intermediate position by translating in the direction of the insertion X-X, and from the second intermediate position to the configuration position by rotating about the axis of rotation A-A.

Figure 6:
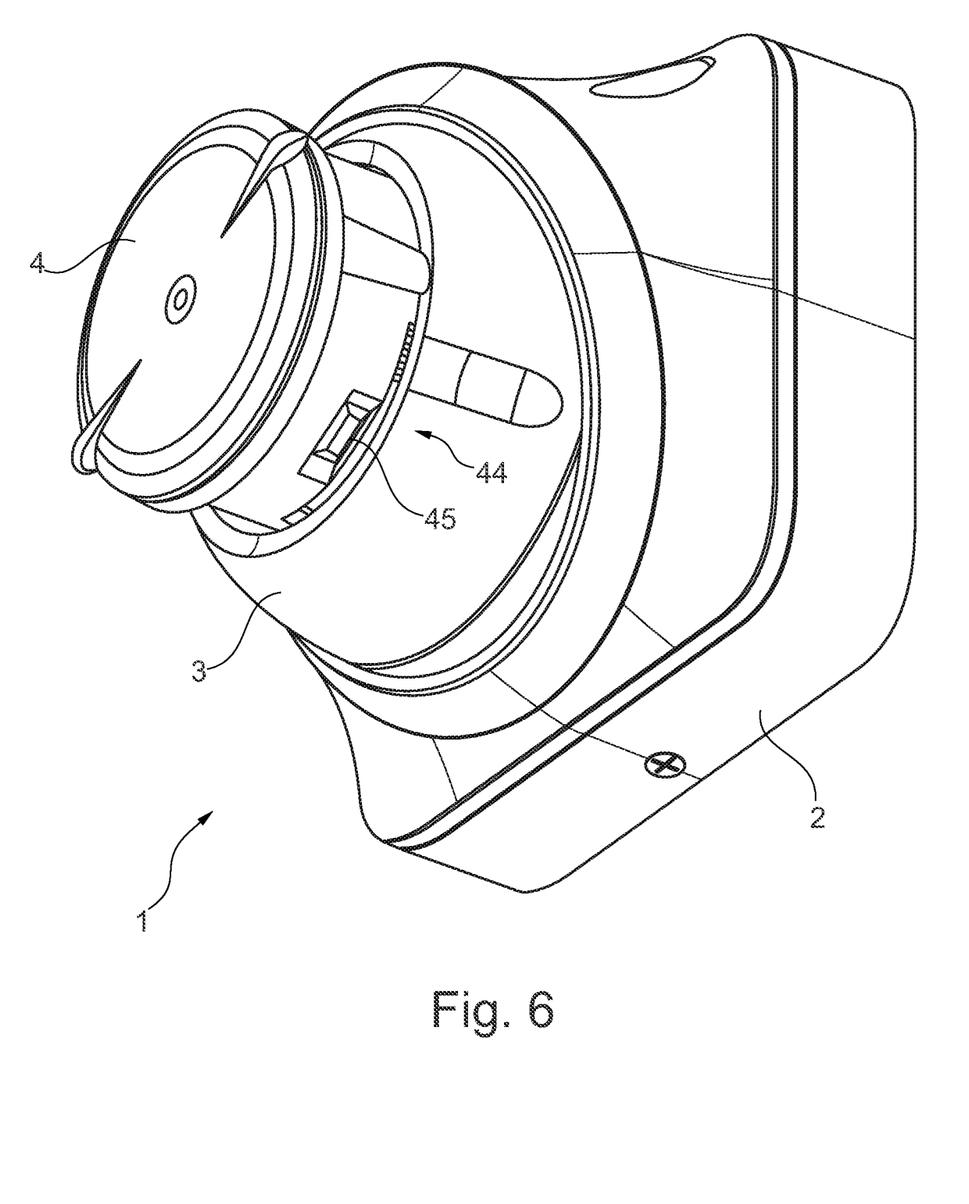
FIGS. 6 and 7 show the device of FIG. 1 in two distinct assembly steps.

It shall be noted that, in the first intermediate position, the spherical body 3 and the detection member 4 are in such arrangement as to prevent a user from accessing the interface 44, and in the second intermediate position the interface 44 can be accessed by a user. In FIG. 6 for example, the detection member 4 is arranged in the second intermediate position.

The guide means 5 are configured to guide the movement of the detection member 4 relative to the seat 31 of the spherical body 3 between the operating position and the configuration position. For this purpose, the guide means 5 comprise a first guide 53 and a second guide 54. The slider 51 is able to slide along the first guide 53 as the detection member moves from the operating position to the at least one intermediate position, namely the first intermediate position. Furthermore, the slider 51 is able to slide along the second guide 54 as the detection member moves from the at least one intermediate position, namely the second intermediate position, to the configuration position.

In the preferred embodiment the guide means 5 also comprise a third guide 55. The slider 51 is able to slide along the third guide 55 as the detection member moves from the first intermediate position to the second intermediate position.

The first guide 53 and the second guide 54 are spaced apart in the direction of insertion X-X and are preferably parallel to each other. The first and the second guides 53, 54 particularly extend each on a respective plane perpendicular to the direction of insertion X-X. The first guide 53 angularly extends through the first angle α, and the second guide angularly extends through the second angle β. The third guide 55 is placed between the first guide 53 and the second guide 54, and preferably extends in the direction of insertion X-X.

The first and the second guides 53, 54 are connected to the insertion guide 52. Particularly, the third guide 55 may be defined by a portion of the insertion guide 52. In other words, the insertion guide 52 is composed of a third guide 55, which extends between the first guide 53 and the second guide 54, and of a fourth guide 56, which extends between the second guide 54 and the edge 32*a* of the spherical body 3 that delimits the access opening 32 for access to the seat 31.

The guide means 5 are then configured to cause the detection member 4 to assume the at least one intermediate position as it moves from the operating position to the configuration position. Therefore, the detection member 4, in this embodiment, may not be moved directly from the operating position to the configuration position without passing through the at least one intermediate position.

Preferably, the first guide 53 comprises a limit stop member 53*a* which is configured to retain the slider 51 when the detection member 4 is in the operating position, while the second guide 54 comprises a limit stop member 54*a* configured to retain the slider 51 when the detection member 4 is in the configuration position. In the preferred embodiment, the two limit stop members 53*a*, 54*a* are defined by a depression in the respective guides 53, 54, said guides 53, 54 being in the form of grooves. Furthermore, the slider 51 comprises a resilient member 51*a* which is shaped for snap-fit engagement in the limit stop members 53*a*, 54*a*. By this arrangement, the detection member 4 may be locked to the seat 31 in the operating position or in the configuration position.

By applying an adequate force, and particularly of a pair of forces, tending to rotate the detection member 4 relative to the seat 31 about the rotation axis A-A, the resilient member 51*a* has a shape that allows it to elastically shrink back, at least partially, from the limit stop members 53*a*, 54*a*, and to slide in the grooves. Therefore, the detection member 4 preferably comprises rotation members 46 that are adapted to be gripped by a user to rotate the detection member 4 relative to the seat 31. The rotation members 46, for example, may project out of the closure member 42.

It shall be noted that the limit stop members 53*a*, 54*a* are spaced apart from the third guide 55 as well as from the insertion guide 52. Therefore, in the operating position and/or in the configuration position, the slider 51 is spaced apart from the insertion guide 52. Preferably, no guide for the slider 51 extends in the direction of insertion X-X and leads directly from the limit stop member 53*a* of the first guide 53 to the limit stop member 54*a* of the second guide 54. Therefore, as the detection member 4 moves from the operating position to the configuration position, it shall assume at least one intermediate position, rotated relative to the operating position about the axis of rotation A-A.

Accordingly, the guide means 5 are configured to prevent a translational movement of the detection member 4 in the direction of the insertion X-X when the detection member 4 is in the operating position, and preferably also when it is in the configuration position.

A skilled person may obviously envisage a number of equivalent changes to the above disclosed embodiments, without departure from the scope of the appended claims.

The invention claimed is:

1. An electronic motion detection device, comprising:
a support structure securable to a wall,
a spherical body associated with the support structure and rotationally supported by the support structure, the spherical body being lockable to the support structure according to a plurality of spatial orientations, the spherical body having a seat,
a detection member insertable into the seat of the spherical body along an insertion direction, the detection member comprising a sensitive element configured for detecting the movement of a body in a location and an interface configured for exchanging configuration data for the sensitive element,
wherein the detection member is lockable to the seat of the spherical body in an operating position and in a configuration position, wherein:
in the operating position, the spherical body and the detection member are arranged so as to prevent a user from accessing the interface,
in the configuration position, the detection member is translationally shifted in the insertion direction with respect to the operating position so as to make the interface accessible by a user.

2. The device according to claim 1, wherein, in the operating position and/or in the configuration position, the detection member is coupled with the seat of the spherical body unmovably along the insertion direction.

3. The device according to claim 1, wherein the detection member is insertable into the seat of the spherical body up to the operating position and/or to the configuration position by means of a bayonet sliding system.

4. The device according to claim 1, wherein the detection member is movable with respect to the seat of the spherical body between the operating position and at least one intermediate position, and between the at least one intermediate position and the configuration position, wherein:
in the at least one intermediate position, the detection member is rotated by a first angle with respect to the operating position about a rotation axis which extends in the insertion direction, and
in the configuration position, the detection member is rotated with respect to the at least one intermediate position about said rotation axis by a second angle equal and opposite to the first angle.

5. The device according to claim 4, wherein in the at least one intermediate position the detection member is movable with respect to the seat along the insertion direction.

6. The device according to claim 4, comprising guide means associated with the detection member and with the seat of the spherical body, the guide means being configured for guiding the movement of the detection member with respect to the seat of the spherical body between the operating position and the configuration position, the guide means being configured for making the detection member assume the at least one intermediate position when passing from the operating position to the configuration position.

7. The device according to claim 6, wherein the guide means comprise a first guide, a second guide and a slider, the slider being slidable along the first guide when the detection member passes from the operating position to the at least one intermediate position, and along the second guide when the detection member passes from the at least one intermediate position to the configuration position.

8. The device according to claim 7, wherein the first and the second guides are spaced apart from each other in the insertion direction.

9. The device according to claim 3, wherein:
said at least one intermediate position comprises a first intermediate position and a second intermediate position, the detection member being movable from the operating position to the first intermediate position, from the first intermediate position to the second intermediate position, and from the second intermediate position to the configuration position,
in the first intermediate position, the spherical body and the detection member are arranged so as to prevent a user from accessing the interface, and
in the second intermediate position, the interface is accessible by a user.

10. The device according to claim 9, wherein the guide means comprise a first guide, a second guide and a slider, the slider being slidable along the first guide when the detection member passes from the operating position to the at least one intermediate position, and along the second guide when the detection member passes from the at least one intermediate position to the configuration position, and
wherein the guide means comprise a third guide which extends in the insertion direction and is arranged between the first guide and the second guide, the slider being slidable along the third guide when the detection member passes from the first intermediate position to the second intermediate position.

11. The device according to claim 1, wherein the spherical body has an access opening to access the seat, the access opening being closed by the detection member in the operating position.

12. The device according to claim 1, wherein said support structure comprises a bearing element directly securable to a wall and a locking element associated with the bearing element, the locking element being suitable for holding the spherical body against the bearing element in said plurality of spatial orientations.

13. A kit comprising:
an electronic motion detection device according to claim 1, wherein the interface comprises a connection port,
a transmission device which is insertable in said connection port when the detection member is in the configuration position, the transmission device being configured for establishing a wireless connection to exchange said configuration data between a computing device and the sensitive element via said interface.

* * * * *